United States Patent
Lösel

[11] Patent Number: 5,136,175
[45] Date of Patent: Aug. 4, 1992

[54] CURRENT SUPPLY CIRCUIT ARRANGEMENT

[75] Inventor: Walter Lösel, Fürth, Fed. Rep. of Germany

[73] Assignee: U.S. Philips Corporation, New York, N.Y.

[21] Appl. No.: 281,576

[22] Filed: Dec. 8, 1988

[30] Foreign Application Priority Data

Dec. 12, 1987 [DE] Fed. Rep. of Germany ....... 3742188

[51] Int. Cl.$^5$ .......................... H02J 7/00; G05F 1/40
[52] U.S. Cl. ........................................ 307/66; 323/273
[58] Field of Search ............... 307/66, 64; 363/89; 323/273; 320/1

[56] References Cited

U.S. PATENT DOCUMENTS

| | | | |
|---|---|---|---|
| 3,643,152 | 2/1972 | Matsumurra et al. | 323/273 |
| 4,317,056 | 2/1982 | Alberts | 307/64 X |
| 4,528,459 | 7/1985 | Wiegel | 307/66 |
| 4,591,782 | 5/1986 | Germer | 365/228 X |
| 4,677,311 | 6/1987 | Morita | 307/66 |
| 4,684,877 | 8/1987 | Shreve et al. | 323/273 X |
| 4,701,858 | 10/1987 | Stokes et al. | 365/229 X |
| 4,704,542 | 11/1987 | Hwang | 307/66 |
| 4,788,450 | 11/1988 | Wagner | 307/66 X |

Primary Examiner—Sharon D. Logan
Attorney, Agent, or Firm—Bernard Franzblau

[57] ABSTRACT

A circuit arrangement for the supply of emergency current in the case of a mains failure, comprises an electrolytic capacitor which is connected through a diode to a charging voltage which is higher than the required output voltage. The new current supply circuit arrangement avoids energy losses as far as possible and guarantees a sufficiently rapid availability of the energy to be stored in the electrolytic capacitor in that the capacitor charging voltage is derived from an auxialiary voltage source. In a further embodiment, a transistor is connected between the electrolytic capacitor and the output terminal of the current supply circuit and is operated in the inverse mode in order to precharge the electrolytic capacitor with a base charge. This current supply circuit arrangement can be used for the emergency current supply of microcomputer systems.

21 Claims, 1 Drawing Sheet

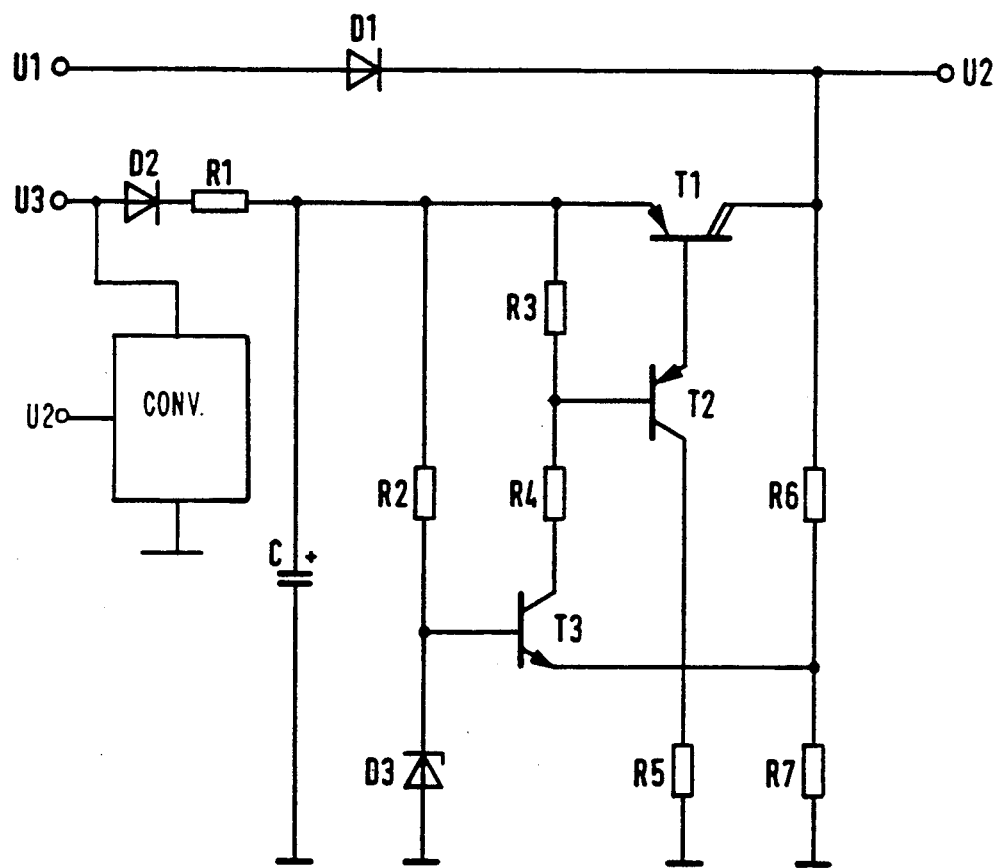

CURRENT SUPPLY CIRCUIT ARRANGEMENT

BACKGROUND OF THE INVENTION

This invention relates to a current supply circuit arrangement having an output to which a supply voltage is supplied through a diode and which comprises a capacitor, to which the charging voltage of an an auxiliary voltage source is supplied through a further diode, which charging voltage exceeds the supply voltage.

DE OS 33 00 222 discloses a system for resetting a switching circuit comprising a microprocessor in the case of mains failure or when the mains voltage temporarily falls below a given limit value, in which circuit, after the occurrence of these conditions, a capacitor coupled to a supply voltage is discharged by means of a transistor controlled by a voltage control circuit. The input of a voltage stabilization circuit is connected to the first capacitor and the output voltage of this circuit is supplied to a microcomputer, which comprises the microprocessor. Upon failure of the mains voltage, the first capacitor applied to the supply voltage is applied through the transistor to a higher supply voltage of a second capacitor. In the normal case, the voltage at the second capacitor has double the value of the supply voltage for the microcomputer.

Due to the supply of a capacitor with a higher voltage than the supply voltage, a larger quantity of energy can be stored in the capacitor, which permits a longer bridging of mains failures. For this purpose, the additionally required higher supply voltage must be derived from the additional supply voltage source, which can apply a corresponding current for charging the capacitor in order to guarantee the readiness for operation of such an emergency current supply already after a sufficient period of time. This high current load capacity of the additional voltage source requires larger dimensions of the apparatus and leads to a corresponding higher cost.

SUMMARY OF THE INVENTION

The present invention has for its object to construct a circuit arrangement of the kind mentioned in the opening paragraph in such a manner, that as the additional voltage source for making available a second higher supply voltage, use can be made of a voltage source having a lower current load capacity.

This object is achieved in that the capacitor can be connected through a current path to the output voltage.

Further advantageous embodiments of the invention will become apparent from the discussion which follows.

BRIEF DESCRIPTION OF THE DRAWING

In order that the invention may be readily carried out, it will now be described more fully, by way of example, with reference to the sole Figure of the accompanying drawing.

DESCRIPTION OF THE PREFERRED EMBODIMENT

The invention is based on the idea that emergency current supply arrangements, for example, for microcomputer systems, must be fully operable only after a given time has elapsed after the microcomputer system has been switched on. In microcomputer systems, for example, the emergency supply arrangement should be capable of supplying a supply current until an auxiliary program started at the beginning of the mains failure has transmitted all the data stored in volatile data carriers to a non-volatile data medium. However, if a mains failure occurs during the initiation stage of the microcomputer system, no data have been obtained as yet for which such a data saving would be effective. After termination of the mains failure, the microcomputer system must be started again at any rate with the initiation routine. Therefore, it is sufficient that the electrolytic capacitor, which stores the energy for the duration of the saving routine, be fully charged only at the end of the initiation stage. The charging current of the electrolytic capacitor is chosen to be small. This has the advantage that the auxiliary voltage source for the charging current is designed only for a correspondingly low load capacity and can therefore be constructed with suitable elements in a space-saving manner.

With undisturbed operation, an output voltage U2 is obtained from a supply voltage U1 in the circuit arrangement shown in the Figure. In this case, the supply voltage U1 is supplied through a first decoupling diode to an output terminal, at which the output voltage U2 can be derived. In the case of failure of the mains voltage, in which the supply voltage also breaks down, no current can consequently flow back from the output terminal into the supply voltage source. An auxiliary voltage source, whose auxiliary voltage U3 is a multiple of the output voltage U2 or of the supply voltage U1, is connected through a second decoupling diode D2 to an electrolytic capacitor C, whose other connection is connected to a reference potential, for example, ground. A current-limiting resistor R1 is connected in series with this second decoupling diode D2. The current-limiting resistor R1 is at most proportioned so that at the end of the initiation stage of the microcomputer system the electrolytic capacitor is fully charged. In the case of a shortcircuit between the output and the reference potential, in the exemplary embodiment the supply voltage U1 is switched off by an overload protection circuit (not shown), while the auxiliary voltage source still remains operative. The shortcircuit current then flowing through the circuit arrangement, more particularly through the transistor T1, is limited by means of the current-limiting resistor R1 so that damage to the circuit arrangement is thus avoided. In the embodiment of the voltage converter for the auxiliary voltage source, a voltage doubling circuit is used. This circuit may advantageously be constructed without the use of a transformer. This circuit is connected to an alternating voltage source from which the supply voltage U1 is also obtained.

The capacitor C is moreover connected to the emitter of the transistor T1, whose collector is connected to the output terminal. By means of a series arrangement of a series resistor R2 and a Zener diode D3 connected parallel to the capacitor, a comparison voltage is supplied to the base of a comparator transistor T3. This voltage is obtained from the capacitor voltage. The emitter of the comparator transistor T3 is connected to the centre tapping on a voltage divider comprising a first subresistor R6 and a second subresistor R7. The voltage divider itself is located between the output terminal and the reference potential. The collector of the comparator transistor T3 is connected through a collector resistor constituted by a series arrangement of two collector subresistors R3 and R4 to the capacitor C. If the subvoltage across the voltage divider resistor R7 obtained from the output voltage falls below the voltage of the Zener diode minus the base-emitter voltage of the comparator transistor T3, the latter begins to conduct and a collector current flows through the collector subresistors R3, R4. The base of the transistor T1 is connected to the emitter of a control transistor T2, whose collector is connected through a collector resistor R5 to the reference voltage potential. The base of the control transistor T2 is connected to the center tapping of the collector subresistors R3, R4. As soon as a sufficient current flows through the collector subresistors R3, R4, a voltage drop occurs across these collector subresistors and this voltage drop drives the control transistor T2. The emitter current of the control transistor now drives in turn the transistor T1 so that a discharge current flows from the electrolytic capacitor C through the transistor T1 to the output terminal. The transistors then constitute together a control circuit, as a result of which the discharge current of the electrolytic capacitor C is controlled so that the output voltage U2 is kept constant. The voltage divider connected to the output terminal and the collector subresistors are proportioned so that the transistor T1 becomes conductive as soon as the voltage at the output terminal is lower than the minimum voltage which can occur with undisturbed operation of the supply voltage source. However, this voltage must be at least equal to the minimum permissible operating voltage of the connected loads.

When the electrolytic capacitor C is further discharged, its voltage falls below the required output voltage U2 and also below to the Zener voltage of the diode D3. As soon as the voltage across the electrolytic capacitor has reached the voltage of the Zener diode D3, the comparator transistor T3 no longer receives any base current and the transistor T1 is cut off via the control transistor T2. By a corresponding proportioning of the Zener diode D3, this voltage can advantageously be adjusted so as to be equal to the minimum possible value of the output voltage. This affords the advantage that the loads connected to the output terminal are always supplied only with an output voltage which varies within a given voltage range. Thus, unpredictable functions, which can occur when the output voltage falls below the operating voltage required for the connected loads, are avoided because in this case the output voltage is fully switched off.

By means of the current-limiting resistor R1, the charging current is supplied to the electrolytic capacitor, which is the reason why the voltage across the electrolytic capacitor C increases only slowly. By means of an advantageous form of the circuit arrangement shown in the embodiment, a substantial saving in time is attained when charging the electrolytic capacitor.

After the supply voltage U1 has been switched on, the voltage at the collector of the transistor T1 is at first higher than the voltage at its emitter. The base of the transistor T1 is connected through the emitter-base path of the control transistor T2 and the collector subresistor R3 to the electrolytic capacitor. This has the advantage that the transistor T1 is conductive in the so-called inverse mode of operation if a corresponding base current flows and the voltage at the collector of the transistor T1 is larger than the voltage at its emitter. If the transistor T1 and the control transistor T2 are of the same conductivity type (in the embodiment shown of the pnp conductivity type), with a correspondingly sufficient collector-emitter voltage of the transistor T1, a collector-emitter current flows through the emitter-base path of the control transistor T2 and this current gives rise to a corresponding collector current in the transistor T1. Since this collector-emitter current is considerably higher than the current flowing through the current-limiting resistor R1, the electrolytic capacitor is charged very rapidly by this collector-emitter current until the voltage across the electrolytic capacitor has reached substantially the voltage at the collector of the transistor T1. No collector-base current can then flow any longer and the transistor T1 passes to the cut-off condition.

Thus, the electrolytic capacitor is charged very rapidly to the output voltage U2 become it is precharged within a short time with a base charge. The residual charge of the electrolytic capacitor is then applied, as already described, through the current-limiting resistor R1. In accordance with the base charge, the readiness for operation of this emergency current arrangement is obtained more rapidly.

What is claimed is:

1. A current supply circuit comprising: a first input terminal for a source of supply voltage, an output terminal for connection to a load, a diode coupling the first input terminal to the output terminal so as to couple the supply voltage from the first input terminal to the output terminal, a second input terminal for an auxiliary voltage source which is higher than said supply voltage, a capacitor, a series arrangement of a further diode and a current-limiting resistor coupling the second input terminal to the capacitor to provide a charge path for charging the capacitor from the voltage at said second input terminal, a switchable current path which includes a transistor controlled by a voltage at said output terminal for selectively coupling the capacitor to the output terminal, and a control circuit responsive to the voltage at the output terminal and coupled to said transistor whereby the transistor is held in cut-off when the voltage at the output terminal is equal to or is higher than a minimum operating voltage of the load and below said minimum operating voltage turns the transistor on so as to provide a continuously variable low resistance current path between the capacitor and the output terminal.

2. A current supply circuit as claimed in claim 1, wherein said control circuit is coupled to a control electrode of the transistor so as to operate the transistor in an inverse mode so as to provide a second charge path for the capacitor having a lower resistance than the resistance of said current-limiting resistor.

3. A current supply circuit as claimed in claim 1 wherein said control circuit is coupled to a control electrode of the transistor, said control circuit including a comparator having first and second inputs coupled to said output terminal and to said capacitor whereby the control circuit controls conduction of the transistor as a function of a comparison of the output voltage level and the capacitor voltage level.

4. A current supply circuit as claimed in claim 1 wherein the resistance of said current-limiting resistor provides a relatively short charge time for the capacitor and furthermore limits current from said second input terminal to said output terminal to a safe value in the event of a load short-circuit.

5. A current supply circuit arrangement comprising:
an input for a supply voltage, a diode which couples said input to an output terminal at which an output voltage is developed for a load by the supply voltage, a capacitor, a further diode coupling the capacitor to an output of an auxiliary voltage source whose output voltage is higher than said supply voltage, said further diode providing a charge path from the output of the auxiliary voltage source to the capacitor, which charge path includes a resistor in series with said further diode, said resistor having a finite resistance so as to provide a finite charge time for the capacitor, a current path including a transistor, which current path connects the capacitor to said output terminal to supply an auxiliary output voltage thereto upon a given change in said output voltage, and a control circuit having an input coupled to said output terminal and an output coupled to a control electrode of the transistor whereby said control circuit is responsive to the output voltage to control the transistor into conduction for an output voltage below a safe operating level of the load and into cut-off at least when the output voltage is at a normal operating voltage level for the load.

6. A circuit arrangement as claimed in claim 5 wherein the auxiliary voltage source is a voltage converter which is supplied by the output voltage.

7. A current supply circuit as claimed in claim 5, wherein said control circuit operates the transistor in an inverse mode for a given time interval.

8. A current supply circuit as claimed in claim 5 wherein said auxiliary voltage is an integer multiple of one of said supply voltage and output voltage, and wherein said resistor has a resistance chosen so that the capacitor charge time, upon start-up of the supply circuit, is related to the start-up time of said load.

9. A current supply circuit as claimed in claim 5 further comprising means for supplying an auxiliary charge current to said capacitor from said output terminal when the output voltage exceeds the capacitor voltage by a given voltage level, said auxiliary charge current being higher than a charge current flowing via said capacitor charge path.

10. A current supply circuit as claimed in claim 5, wherein the load comprises a computer system having an initiation routine having a given time duration, and wherein the resistance of said resistor provides a finite charge time for the capacitor that is related to said given time duration.

11. A current supply circuit arrangement comprising:
an input for a supply voltage, a diode which couples said input to an output at which an output voltage is developed, a capacitor, a further diode and a current-limiting resistor coupling the capacitor to an output of an auxiliary voltage source whose output voltage is higher than said supply voltage, said further diode and resistor providing a charge path from the output of the auxiliary voltage source to the capacitor, and a current path which connects the capacitor to said output, wherein the current path has a low resistance with respect to the current-limiting resistor and includes a transistor which is operated in an inverse mode as a function of the output voltage.

12. A circuit arrangement as claimed in claim 11 wherein the transistor is driven by a control circuit a which delivers a control signal derived by comparison between a nomimal voltage and the output voltage.

13. A circuit arrangement as claimed in claim 12, wherein the control circuit comprises a comparator transistor which is connected on its base side to a tapping on a voltage divider connected parallel to the capacitor and drives a control transistor which is connected to the transistor M in the current path.

14. A circuit arrangement as claimed in claim 13, wherein the transistor and the control transistor are of the same conductivity type.

15. A current supply circuit for a load having a given start-up time, said circuit comprising:
an input terminal for a source of supply voltage, an output terminal for supplying an output voltage to the load, a diode coupling the input terminal to the output terminal so as to provide said output voltage to the output terminal, a second input terminal for an auxiliary voltage source which is higher than said supply voltage, a capacitor, a series circuit of a current limiting element and a further diode coupling the second input terminal to the capacitor to provide a charge path for charging the capacitor from the higher voltage at said second input terminal, said current limiting element being operative to charge the capacitor to an operating voltage level on circuit start-up with a time delay approximately equal to the start-up time of the load, and a switchable current path for coupling the capacitor to the output terminal to supply a capacitor discharge current to the output terminal upon a given change in the output voltage.

16. A current supply circuit as claimed in claim 15 wherein said switchable current path includes a transistor, said supply circuit further comprising a control circuit coupled to a control electrode of the transistor and responsive at least to the level of output voltage at said output terminal to make the transistor conductive in response to a given change of the output voltage during normal operation of the supply circuit.

17. A current supply circuit as claimed in claim 16 wherein, in the conductive condition of the transistor, the control circuit controls the transistor to control the capacitor discharge current in a manner such that the output voltage at the output terminal is kept constant for a period of time.

18. A current supply circuit as claimed in claim 15 wherein the switchable current path includes a semiconductor control element that provides a further charge current path for the capacitor from said output terminal provided that the output voltage at the output terminal exceeds the capacitor voltage by a given voltage level.

19. A current supply circuit as claimed in claim 18 wherein said semiconductor control element includes a transistor, and a control circuit for the transistor which allows the transistor to operate in its inverse mode to provide said further charge current path.

20. A current supply circuit as claimed in claim 16 wherein the control circuit includes a comparator for comparing the output voltage level with the capacitor voltage level thereby to control conduction of the transistor as a function of said output voltage level and said capacitor voltage level.

21. A current supply circuit comprising:
a first input terminal for a source of supply voltage,
an output terminal for connection to a load,
a diode coupling the first input terminal to the output terminal so as to couple the supply voltage from the first input terminal to the output terminal,
a second input terminal for an auxiliary voltage source which is higher than said supply voltage,
a capacitor, a series arrangement of a further diode and a current-limiting resistor coupling the second input terminal to the capacitor to provide a charge path for charging the capacitor from the voltage at said second input terminal, a switchable current path controlled by a voltage at said output terminal for selectively coupling the capacitor to the output terminal upon a drop in voltage at the first input terminal and for providing a rapid precharge of the capacitor from said output voltage upon a return of the voltage at the first input terminal.

* * * * *